Figure 1:
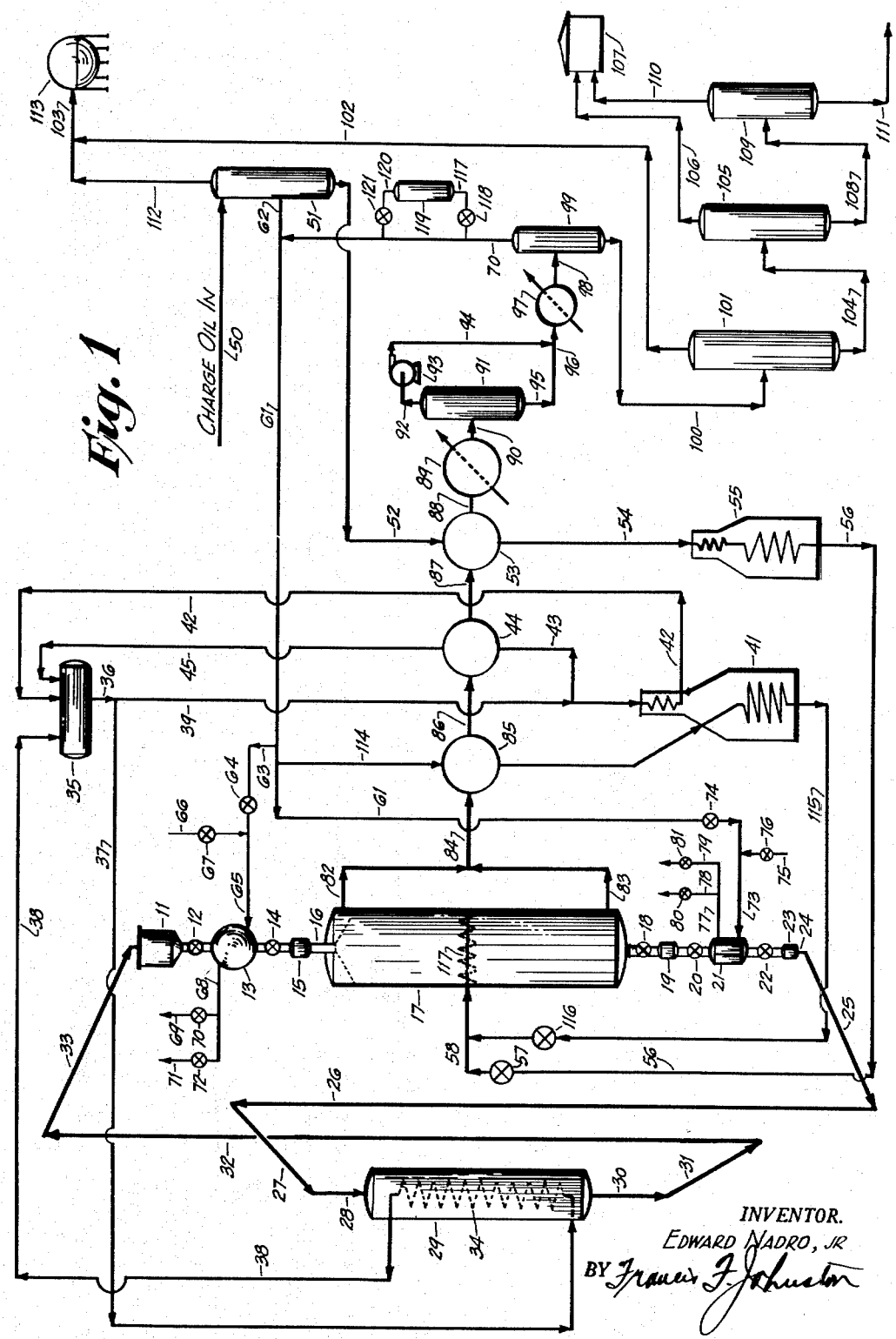

INVENTOR.
EDWARD NADRO, JR.
BY Francis F. Johnston
AGENT

Nov. 22, 1955  E. NADRO, JR  2,724,683
METHOD OF IMPROVING THERMAL BALANCE IN
HYDRODESULFURIZATION AND REFORMING
Filed July 15, 1952  3 Sheets-Sheet 3

INVENTOR.
EDWARD NADRO, JR.
BY Francis F. Johnston

AGENT

United States Patent Office 2,724,683
Patented Nov. 22, 1955

2,724,683

METHOD OF IMPROVING THERMAL BALANCE IN HYDRODESULFURIZATION AND REFORMING

Edward Nadro, Jr., Pitman, N. J., assignor to Socony Mobil Oil Company, Inc., a corporation of New York Application July 15, 1952, Serial No. 298,928

10 Claims. (Cl. 196—28)

The present invention relates to the thermal balance in sequential operations and, more particularly, to improved thermal balance in sequential reforming and desulfurizing hydrocarbons.

At the outset, it is to be understood that, as is generally accepted by those skilled in the art, reforming is the generic designation of those molecular changes which hydrocarbons undergo which are specifically known as isomerization, dehydrogenation and dehydrocyclization. In the reforming of a mixture of hydrocarbons containing hydrocarbons capable of undergoing any one or all of the aforesaid molecular changes, for example a naphtha, the end result of the reforming reaction is an increase in the octane rating of the naphtha. Accordingly, reforming is used herein to designate any one or more of the aforesaid molecular changes whereby the octane rating of the treated mixture of hydrocarbons is raised.

The reforming reactions or molecular changes can be carried out in the presence of various catalysts. To illustrate, by mentioning two general classes of reforming catalysts known to those skilled in the art, there are the alumina-silica cracking catalysts such as the natural clays (fuller's earth), treated natural clays ("Super-Filtrol") and synthetic associations of silica and alumina, usually in gel form, to which can be added other metals or metal compounds for special purposes. A second group of reforming catalysts are those in which a group VI metal or metal compound is associated with alumina or silica. Accordingly, the term catalyst as used herein includes any catalyst which is capable of catalyzing any one or all of the molecular changes, isomerization, dehydrogenation and dehydrocyclization or, in other words, any catalyst in the presence of which at elevated temperatures the octane rating of a mixture of hydrocarbons is raised.

While certain catalysts have been designated desulfurizing catalysts, i. e., catalysts in the presence of which at elevated temperatures sulfur-bearing compounds which are present in many mixtures of hydrocarbons are decomposed and the sulfur set free; on the other hand, it is also known that many of the afore-enumerated reforming catalysts are effective as desulfurizing catalysts. In fact, the use of reforming catalysts as desulfurizing catalysts has been disclosed by several investigators. It is generally agreed that desulfurizing of the hydrocarbon mixture to be reformed should take place before the hydrocarbon mixture is reformed. However, the reverse sequence has also been used. Accordingly, the present invention is directed to the improvement of the thermal balance in the sequential operations, reforming and desulfurizing, whether the reforming reaction be followed by or preceded by the desulfurizing reaction.

The catalyst as employed herein preferably is a particle form catalyst of such size as to flow under the force of gravity and generally being particles about 0.01 to about 0.5 inch in diameter and preferably about 0.1 to about 0.2 inch in diameter. Such particle size catalysts when introduced into a reactor will flow downwardly as a substantially compact column.

When the reforming reaction be preceded by the desulfurizing reaction, the gases from the desulfurizing reaction can be treated for the removal of the sulfur compounds such as hydrogen sulfide produced in the desulfurizing reaction or the removal of such sulfur compounds can be omitted until after the reforming reaction has taken place.

Figure 2:
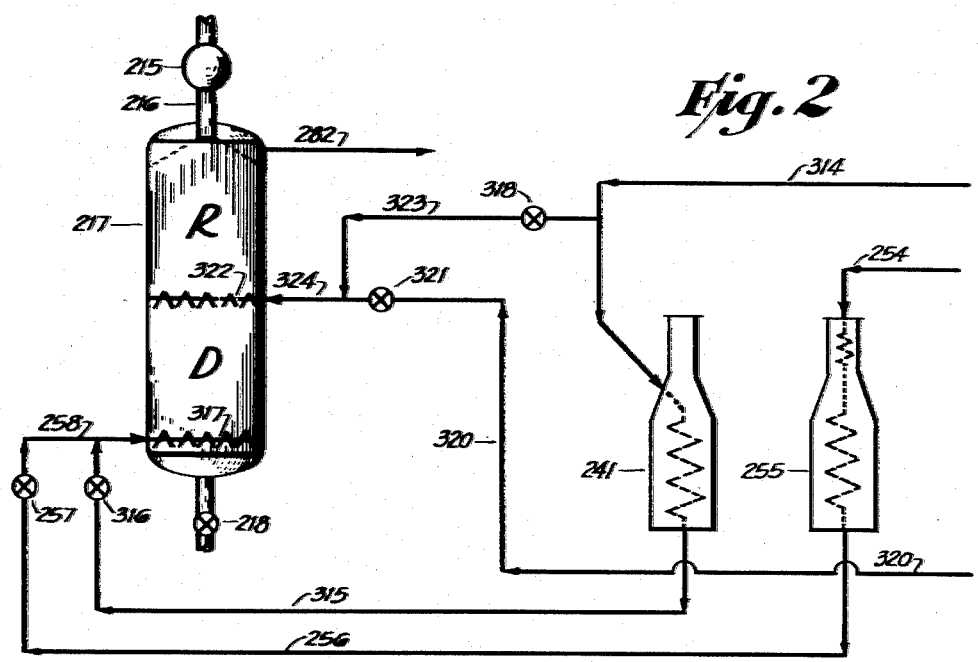
Figure 3:
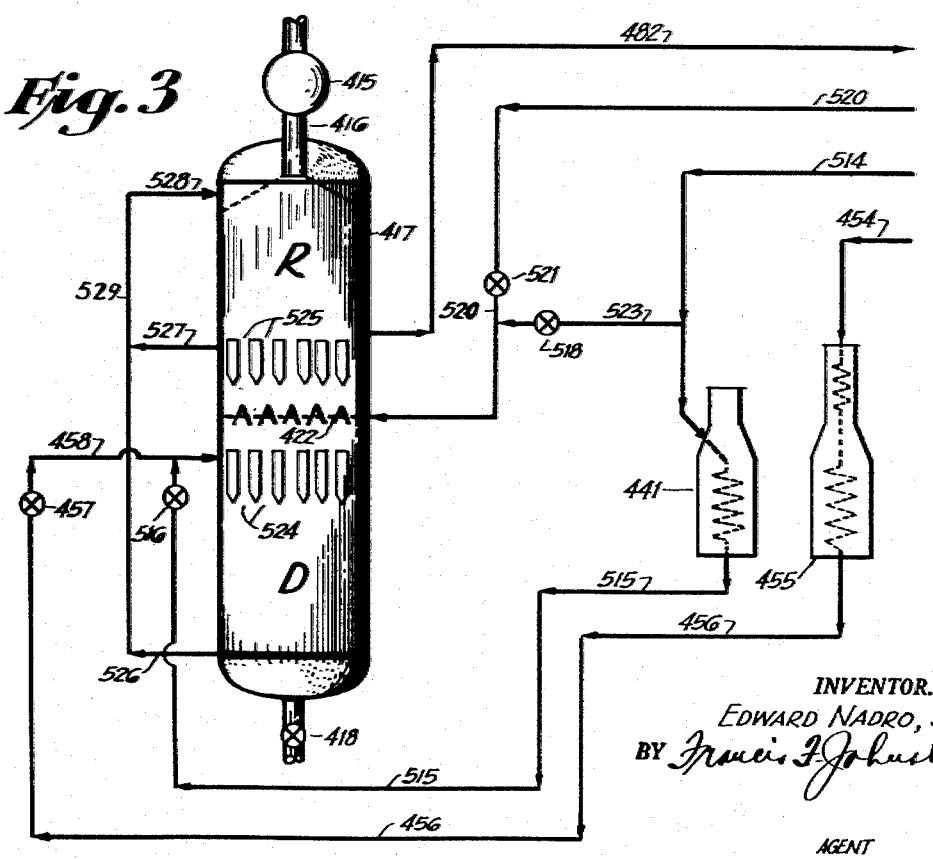
Figure 4:
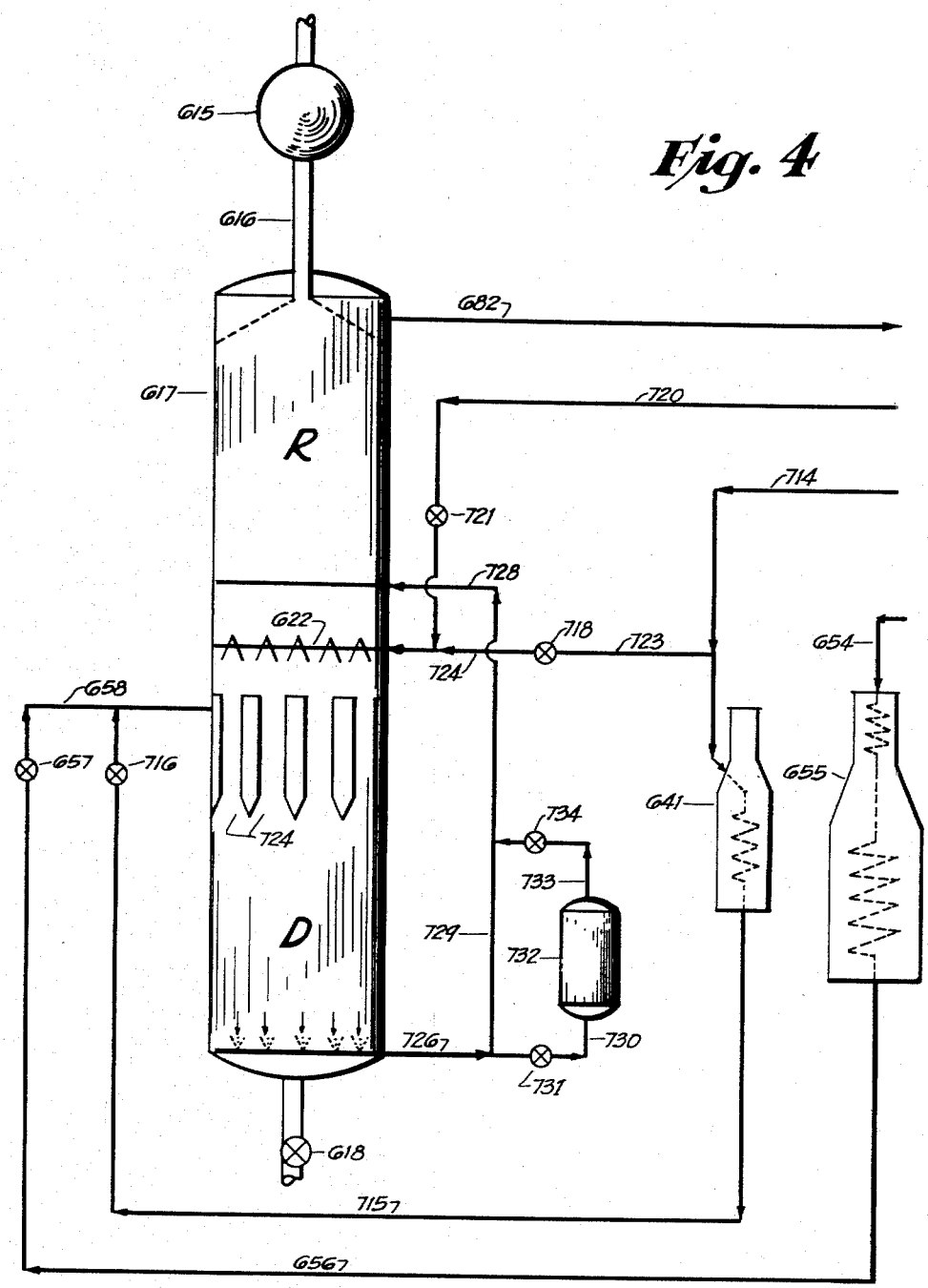

It is also general practice to desulfurize hydrocarbons in the presence of or absence of hydrogen and to reform hydrocarbons in the presence of or in the absence of hydrogen. The principles of the present invention are applicable equally whether both or either reactions take place in the presence of or absence of hydrogen. Accordingly, it is the object of the present invention to provide a method of reforming and desulfurizing hydrocarbons capable of being reformed and containing sulfur compounds capable of being converted into a removable form in the presence of a reforming catalyst wherein a greater portion of the heat energy of the catalyst in the reforming zone is utilized in the reforming reaction. It is another object of the present invention to provide a method whereby particle form solid catalyst flowing as a substantially compact column from a reforming zone into and through a desulfurizing zone is cooled to a desulfurizing temperature by transferring a portion of its heat to hydrocarbons to be reformed. It is a further object of the present invention to provide an improved thermal balance in sequential reforming and desulfurizing reactions wherein a catalyst capable of raising the octane rating of a mixture of hydrocarbons in contact therewith at elevated temperatures flows as a substantially compact column from a reforming zone to a desulfurizing zone and before entering the desulfurizing zone transfers sufficient of the catalyst heat to vapors entering said reforming zone to raise the temperature of said vapors to a catalytic reforming temperature and to lower the temperature of said catalyst to a desulfurizing temperature. It is also within the scope of the present invention to provide an improved thermal balance in sequential reforming and desulfurizing reactions wherein a catalyst capable of raising the octane rating of a naphtha in contact therewith at elevated temperatures flows as a substantially compact column from a reforming zone to a desulfurizing zone and before entering the desulfurizing zone transfers sufficient of the catalyst heat to (1) vapors of a mixture of hydrocarbons having a sulfur content sufficiently low not to require desulfurizing, and (2) vapors of desulfurized hydrocarbons to raise the temperature of the aforesaid vapors to a reforming temperature and to lower the temperature of the aforesaid catalyst to a desulfurizing temperature. Other objects and advantages will become apparent from the following description taken in conjunction with the drawings in which Figure 1 is a schematic flow sheet of a method of reforming hydrocarbons and treating the reformate to recover a mixture of hydrocarbons having an octane number higher than that of the treated hydrocarbons;

Figure 2 is a diagrammatic representation of a reactor in which a mixture of hydrocarbons can be desulfurized and reformed and the reformate treated in according with the flow sheet represented in Figure 1;

Figure 3 is a diagrammatic representation of the application of another embodiment of the present invention to a reactor used in conjunction with the recovery system represented in Figure 1; and Figure 4 is a diagrammatic representation of the application of the principles of the present invention wherein the reaction-produced sulfur compounds are removed, at least in part, before the desulfurized hydrocarbons are reformed and the reformate treated in the recovery system represented in Figure 1.

Since essentially the same or an equivalent recovery system can be used in conjunction with an operation involving desulfurizing as well as reforming as can be used in conjunction with reforming as the sole principal reaction, the reforming of a hydrocarbon mixture and treatment of the reformate will be described first in conjunction with the schematic flow sheet provided in Figure 1.

The reforming operation represented in Figure 1 is one in which the reaction takes place at pressures of about 15 to about 600 p. s. i. a. and preferably at elevated pressures of about 100 to about 300 p. s. i. a. Reforming temperatures are of the order of about 850° to about 1100° F. and preferably about 960° to about 1060° F. The catalyst enters the reactor at the top thereof at a temperature of about 800° to about 1100° F. and preferably at about 960° to about 1060° F. The vapor inlet temperature is about 850° to about 1080° F. and preferably about 960° to about 1060° F. The ratio of recycle gas to charge stock, i. e., hydrocarbons to be reformed is about 1 to 15, preferably about 4 to 10, mols of gas per mol of charge stock, the average molecular weight of the charge stock being determined in the usual manner from the A. S. T. M. distillation. When a hydrogen-containing recycle gas is employed, the gas comprises about 25 to about 80 per cent and preferably about 35 to about 60 per cent hydrogen, balance $C_1$ to $C_6$ hydrocarbons. A hydrogen-containing recycle gas of the aforesaid composition is used in the ratio of about 1 to about 8, preferably about 2 to about 5, mols of hydrogen per mol of charge stock. Space velocities of about 0.1 to about 6, preferably about 0.5 to about 2, volume of charge stock per volume of catalyst per hour are employed.

During the reforming reaction, the catalyst becomes contaminated with a carbonaceous deposit generally known as coke. This deposit reduces the rate of conversion and for reasons of economy must be removed at least in part. Accordingly, the coke is burned-off in a stream of combustion-supporting gas such as air at elevated temperatures of about 600 to about 1400° F. and preferably about 700° to about 1100° F. at pressures of about 15 to about 600 p. s. i. a. and preferably of about 15 to about 35 p. s. i. a.

As was stated hereinbefore, the reforming of hydrocarbons can take place at atmospheric or super-atmospheric pressures in the absence or presence of a recycle gas which can be either a hydrogen-containing gas or a gas substantially devoid of hydrogen, i. e., containing less than about 25 per cent hydrogen.

A description of a reforming process carried out at elevated temperatures has been chosen for the purpose of illustrating the basic operation including recovery of the reformate. For clarity of description, the course of the catalyst through the reactor will be described first and then the path of the reactant and products of the reaction will be traced.

Thus, active reforming catalyst, for example a particle-form reforming catalyst, comprising at least 70 mol per cent alumina and the balance chromia in feed bin 11, passes through a reactor sealing and catalyst transfer device of any suitable type whereby particle-form catalyst can be transfered from a zone at a given pressure to a zone of higher pressure. Of course, when operating at atmospheric pressure, such a reactor sealing and catalyst transfer device is not essential.

The reactor sealing and catalyst transfer device represented in Figure 1 is a pressure lock comprising gas-tight valves 12 and 14 and pressuring chamber 13. The pressuring lock operates in a cyclic manner as follows: With gas-tight valve 14 closed, catalyst is admitted to pressuring chamber 13 until the chamber is filled to a predetermined level. Valve 12 is closed and purge gas such as an inert and/or non-flammable gas, for example flue gas, is drawn from a source not shown through pipe 66 under control of valve 67 and passed through pipe 65 with valve 64 closed, into chamber 13 and vented therefrom through pipes 68 and 71 with valve 72 open and valve 70 closed. Valves 72 and 66 are closed and valve 64 opened and a suitable pressuring gas such as recycle gas drawn from pipe 61 through pipe 63, is passed through pipe 65 into pressuring chamber 13 until the pressure therein is at least that of reactor 17 and preferably about 5 p. s. i. a. higher. Valve 14 is then opened and the catalyst flows into surge chamber 15. Valve 14 is closed and the residual gas in pressuring chamber 13 vented through pipes 68 and 69 with valve 70 open and valve 72 closed. This completes the cycle.

The catalyst in surge chamber 15 flows through conduit 16 into reactor 17. The catalyst flows downwardly through reactor 17 as a substantially compact column. The catalyst leaves reactor 17 through catalyst flow control device 18, for example a throttle valve of any suitable type, into surge chamber 19 and thence through a suitable reactor sealing and catalyst transfer means of any suitable type whereby particle-form catalyst can be transferred from a zone at super-atmospheric pressure to a zone at lower pressure.

The reactor sealing and catalyst transfer means represented in Figure 1 is a depressuring lock comprising gas-tight valves 20 and 22 and depressuring chamber 21. The depressuring lock operates in a cyclic manner as follows: With gas-tight valves 20 and 21 closed, a suitable gas such as recycle gas is drawn from pipe 61 under control of valve 74 and passed through pipe 73 into depressuring chamber 21 with valves 80 and 81 closed until the pressure therein is approximately that of reactor 17. Gas-tight valve 20 is then opened and catalyst flows from surge chamber 19 into depressuring chamber 21. Gas-tight valve 20 is closed and the gas in chamber 21 vented through pipes 77 and 78 with valve 80 open and valve 81 closed. When the pressure in chamber 21 is reduced to that of kiln 29, valve 80 is closed, valve 81 opened, valve 74 closed and valve 76 opened. A purge gas, such as an inert and/or non-flammable gas, for example flue gas, is drawn from a source not shown through pipe 75 and passed through pipe 73 into chamber 21 and the catalyst therein. The purge gas is vented through pipes 77 and 79 with valve 81 open and valve 80 closed. This completes the cycle.

The catalyst flows from depressuring chamber 21 through gas-tight valve 22 into surge chamber 23. From surge chamber 23 the catalyst flows through conduit 24 into chute 25 to any suitable catalyst transfer means such as a gas-lift or the like, an elevator or the like, etc.

The catalyst transfer means depicted is a bucket elevator 26 having a chute 27 through which the catalyst flows to conduit 28 and thence into kiln 29 which can be of any suitable type wherein the coke can be burned-off the catalyst at temperatures below the damaging temperature of the catalyst.

As the catalyst flows downwardly through kiln or regenerator 29, it contacts coils 34 through which a heat transfer medium such as water, low melting alloys, molten salts, etc., is passed. As represented in Figure 1, the heat transfer medium is water drawn from steam drum 35 through pipe 37 and returned from coils 34 to steam drum 35 through pipe 38. During passage through kiln or regenerator 29 the coke is burned off and the activity of the catalyst restored. The catalyst leaves kiln 29 through conduit 30 and flows along chute 31 to catalyst transfer means 32 which can be of any suitable type such as gas-lift and the like, elevator and the like, etc. As represented in Figure 1, the catalyst transfer means 32 is an elevator which discharges the activated catalyst into chute 33 along which the active catalyst flows to reactor feed bin 11, completing a cycle.

The hydrocarbon mixture to be reformed, for example a virgin naphtha or a cracked naphtha or a mixture of virgin naphtha and cracked naphtha, is drawn from a source not shown through line 50 and passed into absorber 51 wherein the naphtha, i. e., charge stock contacts gas from the reactor and absorbs light hydrocarbons. The charge stock leaves absorber 51 via line 52 and thence through heat exchanger 53. The charge stock leaves heat exchanger 53 through line 54 and passes through furnace 55 wherein it is heated to about 850° to about 1080° F. The heated charge stock leaves furnace 55 through line 56 and passes to line 58 under control of valve 57.

When the reforming action is to be carried out in the presence of a heat carrier such as recycle gas containing less than 20 per cent hydrogen or in the presence of hydrogen or hydrogen-containing gas such as recycle gas containing in excess of 20 per cent hydrogen, the gas is mixed with the charge stock to form a charge mixture. Thus, a recycle gas is drawn from pipe 61, passed through pipe 114 to heat exchanger 85 and thence to furnace 41 wherein it is heated to a temperature such that when mixed with the charge mixture in the ratio of about 1 to about 15 mols of gas per mol of charge stock to form a charge mixture, the charge mixture has a temperature of about 850° to about 1080° F. and preferably about 960° to about 1060° F. The heated gas leaves heater 41 through pipe 115 under control of valve 116 and is mixed with the heated charge stock in line 58. In addition, water from drum 35 flows through pipe 39 to coil 40 in heater 41 and thence through pipe 42 back to steam drum 35.

The charge mixture is distributed across the cross-section of reactor 17 by means of a distributor 117 of suitable type. The charge mixture vapors, in part, flow upwardly counter-current to the downwardly flowing substantially compact column of catalyst and the reformant effluent from the upper reforming zone leaves reactor 17 through line 82. That portion of the charge mixture which flows downwardly concurrent with the downwardly flowing substantially compact column of catalyst leaves the lower reforming zone of the reactor via line 83. The effluent mixtures from both the upper and lower reforming zones are mixed in line 84, pass through heat exchanger 85 into line 86 thence through heat exchanger 44 wherein, by indirect heat exchange, water from steam drum 35 drawn through pipes 39 and 43 is heated and returned to steam drum 35 through pipe 45. The effluent passes from heat exchanger 44 through line 87 into heat exchanger 53 and thence through line 88 into cooler 89. From cooler 89 the effluent passes through line 90 into liquid-gas separator 91.

In liquid-gas separator, the condensed hydrocarbons separate and are withdrawn through line 95. The uncondensed portion of the effluent leaves separator 91 through pipe 92, is compressed in compressor 93 and passed through pipe 94 to line 96. The condensed and separated hydrocarbons pass from line 95 into line 96 and mix therein with the re-compressed effluent from pipe 94. The mixture of condensed effluent and compressed gaseous effluent passes through condenser 97, thence through line 98 into gas-liquid separator 99.

In gas-liquid separator 99 the condensed effluent separates and leaves separator 99 through line 100 and to depropanizer 101. In depropanizer 101 the $C_1$ to $C_3$ hydrocarbons pass overhead through line 102 to pipe 103 to mix with stripped gas from absorber 51 and pass through pipes 112 and 103 to holder 113.

The bottoms from depropanizer 101 pass through line 104 to primary re-run tower 105 from which the light-end passes through line 106 to gasoline storage 107 as gasoline of improved octane rating, while the bottoms leave primary re-run tower 105 through line 108 to secondary re-run tower 109. The light-end leaves secondary re-run tower 109 as overhead through line 110 as gasoline of improved octane rating and thence to storage tank 107. The bottoms, polymer, leaves secondary re-run tower via line 111 to storage not shown.

In Figure 2 a reactor is represented which can be used for reforming and desulfurizing a hydrocarbon mixture containing sulfur compounds catalytically convertible into inorganic sulfur compounds and hydrocarbons capable of being reformed wherein the organic sulfur compounds are converted to inorganic sulfur compounds and hydrocarbons susceptible to isomerization and/or dehydrogenation and/or dehydrocyclization are so treated. Reactor 217 can be used for atmospheric or superatmospheric reforming and desulfurizing in the presence of or absence of a gaseous heat carrier or in the presence or absence of hydrogen.

The course of the catalyst through the reactor is the same as in reactor 17. That is to say, hot active catalyst enters reactor 217 through conduit 216 from surge chamber 215. The catalyst flows downwardly through reactor 217 as a substantially compact column and leaves reactor 217 through catalyst flow control means 218 similar to catalyst flow control means 18 of Figure 1. However, it will be observed that in contra-distinction to the flow of charge mixture as represented in Figure 1, the flow of reactant represented in Figure 2 is entirely counter-current to the flow of the catalyst.

Thus, when a charge stock is to be desulfurized in the absence of hydrogen, charge stock drawn from a source not shown through line 254 is heated in furnace 255 to about 500° to about 800° F. and preferably about 600° to about 800° F. The heated charge stock leaves furnace 255 through line 256 under control of valve 257. The heated charge stock enters line 258 and passes to distributor 317.

Distributor 317 is of any suitable type whereby the charge stock is distributed over the cross-section of reactor 217.

The desulfurizing of the charge stock takes place in that portion of reactor 217 between upper distributor 322 and lower distributor 317 and indicated as zone D on the drawing. The catalyst passing distributor 322 is at an elevated temperature considerably above the required desulfurizing temperature and hence must be cooled to a temperature such as to provide a desulfurizing temperature in desulfurizing zone D and the heat of reaction.

Desulfurizing takes place in the presence of the aforementioned catalysts at about 500° to about 900° F. and preferably at about 700° to about 900° F. Accordingly, catalyst passing from the reforming zone R, formed between distributor 322 and the collector, not shown, connected with reactor effluent line 282 before passing into desulfurizing zone D, is cooled to a temperature of about 500° to about 900° F. The cooling of the catalyst is obtained by transfer of heat from the catalyst to the vapors flowing upwardly from the desulfurizing zone and by transfer to a second charge stock introduced into the reactor through distributor 322.

The secondary charge stock is any suitable mixture of hydrocarbons containing hydrocarbons capable of being reformed. Thus, the reforming also being carried out in the absence of a gaseous heat carrier and in the absence of hydrogen for the purposes of this description, the secondary charge stock, being a mixture of hydrocarbons containing hydrocarbons capable of being reformed and upon reforming yielding a reformate containing preferably no more sulfur than the reformate formed from the desulfurized primary charge stock, for example a cracked naphtha, is drawn from a source not shown through line 320, under control of valve 321, and passed through line 324 into distributor 322.

The secondary charge stock is heated to a temperature below that of catalytic reforming and such that when introduced into reforming zone R, the secondary charge stock absorbs about 20 to about 80 and preferably about 35 to about 65 per cent of the heat which must be transferred from the catalyst before the catalyst enters the desulfurizing zone. That is to say, the amount of secondary charge stock and the temperature thereof when introduced into reforming zone R is such that said secondary charge stock absorbs about 20 to about 80 and preferably about 35 to about 65 per cent of the heat to be transferred from the catalyst to reduce the catalyst temperature to a desulfurizing temperature.

The effluent from the desulfurizing zone absorbs the balance of the heat to be transferred from the catalyst to reduce the temperature of the catalyst from a reforming temperature to a desulfurizing temperature.

The secondary charge stock and the effluent from the desulfurizing zone flow upwardly counter-current to the downwardly flowing substantially compact column of catalyst.

It will be noted that this is in distinct contrast to the operation discussed in U. S. Patent No. 2,293,759 wherein the cold quench flows downwardly through the desulfurizing zone together with the reformed charge stock effluent from the reforming zone. In such an operation, the heat of the catalyst must be transferred to the quench entirely since the reforming zone effluent is at approximately the same temperature as the catalyst. In other words, all of the heat to be absorbed to reduce the temperature of the catalyst and the reforming zone effluent must be absorbed by the quench oil. Whereas in the improved method described herein, the effluent from the desulfurizing zone absorbs a major portion of the heat to be dissipated from the catalyst while the secondary charge stock absorbs the balance.

During passage through reforming zone R, the effluent from desulfurizing zone D and the secondary charge stock are reformed. The products of the reforming action leave the reforming zone R through a collector of any suitable type (not shown) and line 282 to pass to heat exchangers, sulfur removal, and stabilizers, etc., as shown in Figure 1.

The sulfur compounds can be removed from the reactor effluent in any suitable manner. Thus, the effluent from the desulfurizing zone not having been treated for removal of sulfur compounds the total effluent from reactor 217 is passed through various heat exchangers and coolers to liquid gas separator 99, the gaseous effluent from separator 99 can be treated in any suitable manner known to the art, as by a caustic washing by passing the gases from separator 99 through pipes 60 and 117 under control of valve 118 into sulfur removal system 119 and thence through pipe 120 under control of valve 121 to pipe 60.

The condensed effluent from separator 99 can be treated in any suitable manner as by caustic washing to remove susceptible sulfur compounds.

When desulfurizing is to be carried out in the presence of hydrogen, a hydrogen-containing gas such as sulfur-free recycle gas drawn from a source not shown through pipe 314, heated in furnace 241, passed through pipe 315 under control of valve 316 and mixed with the charge stock to be desulfurized in line 258.

When the reforming reaction is to be carried out in the presence of a gaseous heat carrier or a hydrogen-containing gas, a suitable sulfur-free recycle gas drawn from a source not shown through pipe 314 is passed through line 323 under control of valve 318 into line 324 wherein it is mixed with secondary charge stock before being passed into distributor 322.

Referring now to Figure 3 which is representative of a reactor operating at atmospheric or super-atmospheric pressures active catalyst in surge chamber 415 flows through conduit 416 into reactor 417. The catalyst flows downwardly as a substantially compact column through zones R and D and leaves reactor 417 through catalyst flow control means 418 similar to catalyst flow control means 18 in Figure 1.

A charge stock such as a virgin naphtha containing reformable hydrocarbons and sulfur compounds is drawn from a source not shown through line 454 heated in furnace 455 and passed through line 456 under control of valve 457 to line 458. The heated charge stock passes from line 458 to a distributor not shown of any suitable type whereby the charge stock can be distributed over the cross-section of reactor 417.

The charge stock enters the distributor at a temperature of about 500° to about 800° F., and preferably at about 600° to about 800° F. The charge stock is in heat exchange with the catalyst leaving the reforming zone R through indirect heat exchange with the catalyst in seal legs 524. The charge stock flows downwardly concurrent with the downwardly flowing substantially compact column of catalyst and is at least partially desulfurized in its passage through zone D.

The desulfurized charge stock leaves desulfurizing zone D through a collector not shown and line 526 to flow upwardly through line 529.

A suitable secondary charge stock containing hydrocarbons capable of being reformed and upon reforming yielding a reformate containing preferably no more sulfur than the reformate formed from the desulfurized primary charge stock is drawn from a source not shown through line 520 under control of valve 521.

The amount of secondary charge stock and the temperature at which it is introduced into reactor 417 through distributor 422 is dependent upon the amount of heat to be transferred from the catalyst to the primary charge stock in indirect heat exchange through seal legs 524. The secondary charge stock must be in quantity and at a temperature to absorb the balance of that not absorbed by the primary charge stock so that the catalyst will be at a desulfurizing temperature when it enters the desulfurizing zone. Generally, the secondary charge will absorb about 20 to about 80 and preferably about 35 to about 65 per cent of the heat to be absorbed and the balance will be absorbed by the primary charge stock.

The secondary charge stock flows upwardly around the seal legs 525 to a collector not shown and leaves reactor 417 through line 527 to mix with the effluent of the desulfurizing zone D, in line 529.

The mixture of effluent from zone D and secondary charge stock in line 529 flows into line 528 and thence into a distributor not shown which can be of any suitable type whereby the mixture is distributed over the cross-section of reactor 417.

The mixture of effluent from zone D and secondary charge stock flows downwardly concurrent with the downwardly flowing substantially compact column of catalyst and leaves zone R through a collector not shown and line 482.

The effluent from reforming zone R, passes through line 482 to such after-treatment, stabilizing, etc., as is necessary or desired as shown in Figure 1.

When the primary charge stock is to be desulfurized in the presence of hydrogen, a hydrogen containing gas such as recycle gas is drawn from a source not shown through pipe 514, heated in furnace 441, passed through pipe 515 under control of valve 516 into line 458 and mixed therein with the primary charge stock.

When the reforming reaction is to be carried out in the presence of a gaseous heat carrier or a hydrogen-containing gas, a suitable gas is drawn from a source not shown through pipes 514 and 523 under control of valve 518 and admixed with secondary charge stock in line 520.

Another application of the principles of the present invention is represented by the partial schematic flow sheet provided as Figure 4.

Active catalyst in surge tank 615 flows through conduit 616 into reactor 617 having reforming zone R located between distributor 622 and the top of reactor 617 and a desulfurizing zone D located between seal legs 724 and the bottom of reactor 617. The catalyst flows as a substantially compact column downwardly through reforming zone R through seal legs 724 into and through desulfurizing zone D, and leaves the reactor through catalyst flow control device 618 to be reactivated in a regenerator such as kiln 29 in Figure 1.

Those skilled in the art will understand that a regenerator such as the kiln 29 in Figure 1 and means for transferring the catalyst to the regenerator and from the regenerator to the reactor are included although not shown.

The mixture of hydrocarbons to be reformed and desulfurized, i. e., the charge stock, for example a straight run naphtha containing hydrocarbons capable of undergoing one or all of the molecular changes, isomerization, dehydrogenation and dehydrocyclization, in the presence of the catalyst, is drawn from a source not shown through line 654, heated in furnace 655 to a temperature not greater than a desulfurizing temperature and passed through line 656 under control of valve 657 to line 658. The heated primary charge stock is distributed over the cross-section of reactor 617 by means of a distributor not shown of any suitable type associated with line 658. The heated vapors flow downwardly first in indirect heat exchange with the catalyst flowing from zone R through seal legs 724 and then in direct contact concurrent with the downwardly flowing substantially compact column through zone D. During direct contact with the catalyst flowing through zone D, the primary charge stock is at least partially desulfurized. The effluent from zone D passes through a collector not shown of any suitable type whereby the vaporous contents of zone D can be withdrawn from the zone and passed through line 726.

It will be noted that provision is made for either passing the effluent from zone D directly to zone R without removing the sulfur compounds present in the effluent by means of line 729 or to pass the effluent through line 730 under control of valve 731 into sulfur-removal system 732 and thence through line 733 under control of valve 734 back into line 729.

Sulfur removal system 732 can be of any suitable type capable of removing sulfur compounds such as hydrogen sulfide and can be, for example, iron oxide treating system.

Alternatively, the effluent from zone D can be cooled and passed through an absorption system such as one of the diethanolamine or sodium phenolate type to remove hydrogen sulfide, etc., and reheated to a reforming temperature. In the event that the pressure drop through the absorption system is sufficient to reduce the pressure on the effluent below that prevailing in zone R, the pressure can be raised to that of zone R in any suitable manner.

The effluent from zone D whether treated for absorption of removal sulfur compounds or not passes from line 729 through line 728 and a distributor not shown associated therewith into reforming zone R. The distributor associated with line 728 is of any suitable type whereby the effluent from zone D can be distributed over the cross-section of reactor 617.

In accordance with the principles of the present invention, the temperature of the catalyst leaving the reforming zone R must be reduced to a desulfurizing temperature. This is accomplished by transferring at least about 20 to about 80 and preferably about 35 to about 65 per cent of the excess catalyst heat to the effluent vapors and the balance to a secondary charge stock.

The secondary charge stock is drawn from a source not shown, heated in a furnace not shown and passed therefrom through line 720 under control of valve 721 into line 724 and thence through distributor 622 into direct heat exchange with the partially cooled catalyst leaving the reforming zone R.

The secondary charge stock preferably is a mixture of hydrocarbons yielding upon reforming a product containing no more sulfur than is in the reformate produced from the effluent from desulfurizing zone D and containing hydrocarbons capable of undergoing at least one of the molecular changes, isomerization, dehydrogenation and dehydrocyclization.

The secondary charge stock is used in an amount and introduced into reactor 617 at a temperature such that the secondary charge stock will absorb the balance of the heat of the partially cooled catalyst leaving the reforming zone R in excess of that required to maintain a desulfurizing temperature in desulfurizing zone D.

The vapors of effluent from zone D and of the secondary charge stock flow upwardly counter-current to the downwardly flowing substantially compact column of catalyst and leave the reforming zone R through a collector of any suitable type not shown, and line 682. The mixed effluent from reforming zone R passes through line 682 to heat exchangers and after treatment such as represented in Figure 1.

When it is desired to desulfurize the charge stock in the presence of hydrogen, a hydrogen-containing gas such as recycle gas containing about 25 to about 80, preferably about 35 to about 60, per cent hydrogen is drawn from a source not shown through pipe 714, heated to a temperature not greater than a desulfurizing temperature in furnace 641 and passed through pipe 715 under control of valve 716 into line 658 where it is mixed with the charge stock to be desulfurized. Of course, the hydrogen containing gas can be introduced into reforming zone D through a separate distributor when desired.

When it is desired to employ a gaseous heat carrier or to carry out the reforming reaction in the presence of hydrogen in reforming zone R, the gaseous heat carrier or hydrogen-containing gas can be drawn from a source not shown through pipe 714 passed through line 723 under control of valve 718 into line 724 and thence into distributor 622 and the reforming zone. The gaseous heat carrier or hydrogen-containing gas can also be used to extract heat from the catalyst leaving the reforming zone.

In view of the foregoing description it is manifest that in accordance with the principles of the present invention, a hot catalyst capable of accelerating the reforming of hydrocarbons at elevated temperatures of about 850° to about 1100° F. and preferably about 960° to about 1060° F., flows as a substantially compact catalyst column downwardly through said reforming zone, transfers a portion, say about 20 to about 80 and preferably about 35 to about 65 per cent, of the catalyst heat in excess of that required in a desulfurizing operation to the effluent from a desulfurizing zone, transfers the balance of the aforesaid excess heat to a secondary hydrocarbon mixture yielding a reforming zone effluent of no greater non-removable sulfur than said desulfurizing zone effluent, enters a desulfurizing zone at a desulfurizing temperature, flows downwardly through said desulfurizing zone as a substantially compact column of catalyst particles while a hydrocarbon mixture to be desulfurized and reformed enters said desulfurizing zone at a temperature of about 400° to about 900° and preferably about 600° to about 800° F., participates in a desulfurizing reaction to produce an at least partially desulfurized effluent, and said effluent passes through the aforesaid reforming zone to yield a reformate of higher octane rating than the stock charged to the desulfurizing zone. Accordingly, for example, a hydrocarbon mixture to be desulfurized and reformed is introduced into the reforming zone at a temperature of about 500° to about 700° F. with an average desulfurizing zone temperature of about 700° to about 900° F. The reforming zone is maintained at an average reaction temperature of about 850° to about 1100° F. The secondary charge stock enters the reforming zone at about 400° to about 450° F. with a catalyst to oil ratio by volume of about 1 to about 3. Catalyst to oil ratios of about 1 to about 4 and preferably about 1.5 to about 2.5 can be used.

I claim:

1. A method of desulfurizing and reforming hydrocarbon mixtures whereby improved thermal balance is obtained which comprises introducing active particle-form reforming catalyst at a temperature of about 800° to about 1100° F. into a reforming zone at reforming conditions of temperature and pressure, said catalyst containing heat in excess of that required for said reforming reaction, flowing said catalyst downwardly through said reforming zone into a cooling zone, flowing said catalyst downwardly through said cooling zone into a desulfurizing zone under desulfurizing conditions of temperature and pressure at a temperature lower than said reforming temperature and about 500° to about 900° F., flowing said catalyst downwardly through said desulfurizing zone to a catalyst outlet, withdrawing catalyst from said desulfurizing zone, introducing a first hydrocarbon mixture at a temperature of about 500° to about 800° F. into said desulfurizing zone at a locus above the catalyst inlet thereto, flowing said first hydrocarbon mixture in indirect heat exchange with catalyst flowing into said desulfurizing zone, flowing said first hydrocarbon mixture downwardly through said desulfurizing zone, removing reaction products from said desulfurizing zone, introducing a second hydrocarbon mixture at a temperature below said reforming temperature into said cooling zone, flowing said second hydrocarbon mixture upwardly through said cooling zone countercurrent to said downwardly flowing catalyst and in heat exchange relation, withdrawing vapors from said cooling zone, regulating the amount and temperature of said second hydrocarbon mixture to absorb about 20 to about 80 per cent of the catalyst heat in excess of that required for the reaction in said desulfurizing zone to cool said catalyst to a temperature of about 500° to about 900° F. and lower than said reforming temperature, mixing said vapors with said reaction products from said desulfurizing zone, introducing said mixture into said reforming zone, flowing said mixture downwardly concurrent with said reforming catalyst through said reforming zone, withdrawing reaction products from said reforming zone, regulating the amount and temperature of said desulfurizing zone reaction products to extract the balance of said catalyst heat in excess of that required in said desulfurizing zone, to cool said catalyst to a temperature of about 500° to about 900° F. and lower than said reforming temperature prior to entry into said desulfurizing zone.

2. The method of desulfurizing and reforming hydrocarbon mixtures whereby improved thermal balance is obtained as set forth and described in claim 1 wherein the reforming reaction and the desulfurizing reaction take place in the presence of hydrogen, wherein the desulfurizing zone vapors are introduced into the reforming zone at a temperature of about 500° to about 700° F., wherein the reforming zone is maintained at an average reaction temperature of about 850° to about 1100° F., wherein said second hydrocarbon mixture is introduced into the reforming zone at about 400° to about 450° F., and wherein the catalyst-to-oil ratio is about 1 to about 4.

3. A method of desulfurizing and reforming hydrocarbon mixtures whereby improved thermal balance is obtained which comprises introducing active particle-form reforming catalyst containing heat in excess of that required for a reforming reaction and at a temperature of about 800° to about 1100° F. into a reforming zone at reforming conditions of temperature and pressure, flowing said catalyst through said reforming zone into a desulfurizing zone at a desulfurizing temperature of about 500° to about 900° F. and lower than said reforming temperature, introducing a hydrocarbon mixture to be desulfurized and reformed at a desulfurizing temperature into said desulfurizing zone, withdrawing reaction products from said desulfurizing zone, introducing said reaction products at a desulfurizing temperature into said reforming zone, introducing a second hydrocarbon mixture at a temperature below said reforming temperature into said reforming zone, regulating the amount and temperature of said reaction products, the amount and temperature of said second hydrocarbon mixture, and the contact between said catalyst and said reaction products, and said second hydrocarbon mixture to transfer heat from said catalyst to said reaction products and said second hydrocarbon mixture to reform reformable constituents of said reaction products and said second hydrocarbon mixture and to cool said catalyst to a desulfurizing temperature below said reforming temperature, withdrawing catalyst from said desulfurizing zone and withdrawing reaction products from said reforming zone.

4. The method of desulfurizing and reforming hydrocarbon mixtures whereby improved thermal balance is obtained as set forth and described in claim 3, wherein the hydrocarbon mixture to be desulfurized enters said desulfurizing zone at a temperature of about 400 to about 900° F., wherein said desulfurizing reaction takes place in the presence of hydrogen, wherein the desulfurizing zone reaction products enter the reforming zone at a temperature of about 500° to about 700° F., wherein the average desulfurizing zone temperature is about 700° to about 900° F., wherein the reforming zone is maintained at an average reaction temperature of about 850° to about 1100° F., wherein the second hydrocarbon mixture enters the reforming zone at about 400° to about 450° F. and wherein the catalyst-to-oil ratio is about 1 to about 4.

5. A method of desulfurizing and reforming hydrocarbon mixtures whereby improved thermal balance is obtained which comprises introducing active particle-form reforming catalyst containing heat in excess of that required for a reforming reaction and at a temperature of about 800° to about 1100° F. into a reforming zone at reforming conditions of temperature and pressure, flowing said catalyst through said reforming zone into a desulfurizing zone at a desulfurizing temperature of about 500° to about 900° F. and lower than said reforming temperature, introducing a hydrocarbon mixture to be desulfurized and reformed at a desulfurizing temperature into said desulfurizing zone, introducing a hydrocarbon mixture to be reformed at a temperature below said reforming temperature into said reforming zone, regulating the amount and temperature of said hydrocarbon mixture to be reformed and the contact between said hydrocarbon mixture to be reformed and said catalyst to transfer heat from said catalyst to said hydrocarbon mixture to be reformed, to reform reformable hydrocarbons in said hydrocarbon mixture and to cool said catalyst to a desulfurizing temperature below said reforming temperature, introducing a hydrocarbon mixture to be desulfurized at a desulfurizing temperature into said desulfurizing zone, withdrawing reaction products from said desulfurizing zone and said reforming zone, and withdrawing catalyst from said desulfurizing zone.

6. The method of desulfurizing and reforming hydrocarbon mixtures whereby improved thermal balance is obtained as set forth and described in claim 5, wherein the hydrocarbon mixture to be desulfurized enters the desulfurizing zone at a temperature of about 400° to about 900° F., the desulfurizing reaction takes place in the presence of hydrogen, the average desulfurizing zone temperature is about 700° to about 900° F., the hydrocarbon mixture to be reformed enters said reforming zone at a temperature of about 400° to about 700° F., wherein the reforming reaction takes place in the presence of hydrogen and wherein the catalyst-to-oil ratio is about 1 to about 4.

7. A method of desulfurizing and reforming hydrocarbon mixtures whereby improved thermal balance is obtained which comprises, introducing active particle-form reforming catalyst containing heat in excess of that required for a reforming reaction and at a temperature of about 800° to about 1100° F. into a reforming zone at reforming conditions of temperature and pressure, flowing said catalyst through said reforming zone to a cooling zone, flowing said catalyst through a desulfurizing zone at desulfurizing conditions of pressure and a desulfurizing temperature of about 500° to about 900° F. and lower than said reforming temperature, introducing a charge stock comprising a hydrocarbon mixture to be reformed into said reforming zone, introducing a hydrocarbon mixture into said cooling zone, regulating the amount and temperature of both of the aforesaid charge stock and hydrocarbon mixture and contact between said catalyst and the aforesaid charge stock and hydrocarbon mixture to reform reformable hydrocarbons, to transfer heat from said catalyst to the aforesaid hydrocarbon mixtures and to cool said catalyst to a desulfurizing temperature lower than said reforming temperature and about 500° to about 900° F., introducing a hydrocarbon mixture to be desulfurized at a desulfurizing temperature into said desulfurizing zone at desulfurizing conditions of pressure and a temperature of about 500° to about 900° F., withdrawing reaction products from said reforming zone, withdrawing reaction products from said desulfurizing zone, withdrawing vaporous materials from said cooling zone, and withdrawing catalyst from said desulfurizing zone.

8. The method of desulfurizing and reforming hydrocarbon mixture whereby improved thermal balance is obtained as set forth and described in claim 7, wherein said charge stock enters said reforming zone at a temperature of about 500° to 700° F., wherein said hydrocarbon mixture enters said cooling zone at a temperature of about 400 to 450° F., wherein said hydrocarbon mixture to be desulfurized enters said desulfurizing zone at a temperature of about 400 to about 900° F., wherein the average reaction temperature in the reforming zone is about 850° to about 1100° F., wherein the average desulfurizing zone temperature is about 700° to about 900° F. wherein the catalyst-to-oil ratio is about 1 to about 4, wherein the reforming reaction takes place in the presence of hydrogen and wherein the desulfurizing reaction takes place in the presence of hydrogen.

9. A method of desulfurizing and reforming hydrocarbon mixtures whereby improved thermal balance is obtained which comprises introducing active particle-form reforming catalyst at a temperature of about 800° to about 1100° F., into a reforming zone at reforming conditions of temperature and pressure, said catalyst containing heat in excess of that required for said reforming reaction, flowing said catalyst downwardly through said reforming zone to a catalyst outlet and into a desulfurizing zone at desulfurizing conditions of pressure and temperature, said desulfurizing temperature being about 500° to about 900° F. and lower than said reforming temperature, introducing a first hydrocarbon mixture to be desulfurized at a desulfurizing temperature into said desulfurizing zone, flowing said first hydrocarbon mixture in indirect heat exchange with said catalyst into said desulfurizing zone, flowing said first hydrocarbon mixture downwardly concurrently with said downwardly flowing catalyst and in direct heat exchange therewith through said desulfurizing zone, withdrawing catalyst from said desulfurizing zone, withdrawing vapors from said desulfurizing zone, introducing a second hydrocarbon mixture at a temperature lower than said reforming temperature into said reforming zone at a locus near the catalyst outlet of said reforming zone, flowing said second hydrocarbon mixture upwardly counter-current to said downwardly flowing catalyst, introducing said withdrawn desulfurizing zone vapors at a desulfurizing zone temperature lower than said reforming temperature into said reforming zone at a locus near the catalyst outlet of said reforming zone, regulating the amount and temperature of said withdrawn desulfurizing zone vapors, the amount and temperature of said second hydrocarbon mixture and heat exchange relation of said first hydrocarbon mixture, said desulfurizing zone vapors and said second hydrocarbon mixture to transfer about 20 to about 80 per cent of the catalyst heat in excess of that required in said desulfurization zone to said second hydrocarbon mixture and to transfer the balance of said excess catalyst heat to said withdrawn desulfurizing zone vapors to cool said catalyst from said reforming temperature to a lower desulfurizing temperature of about 500° to about 900° F.

10. The method of desulfurizing and reforming hydrocarbon mixtures whereby improved thermal balance is obtained as set forth and described in claim 9, wherein the first hydrocarbon mixture is introduced into the desulfurizing zone at a temperature of about 400° to about 900° F., wherein the average desulfurizing zone temperature is about 700° to about 900° F., wherein the desulfurizing reaction takes place in the presence of hydrogen, wherein the second hydrocarbon mixture enters the reforming zone at a temperature of about 400° to about 700° F., wherein the average reaction temperature in the reforming zone is about 850 to about 1100° F., wherein the reforming reaction takes place in the presence of hydrogen and wherein the catalyst-to-oil ratio is about 1 to about 4.

References Cited in the file of this patent
UNITED STATES PATENTS

| | | |
|---|---|---|
| 2,293,759 | Penisten | Aug. 25, 1942 |
| 2,387,378 | Wolk | Oct. 23, 1945 |
| 2,439,372 | Simpson | Apr. 6, 1949 |
| 2,642,381 | Dickinson | June 16, 1953 |